2,863,820

DECOLORIZATION OF WAXES

Henry C. Beck, Swarthmore, and Robert N. Pim, Media, Pa., assignors to Sun Oil Company, Philadelphia, Pa., a corporation of New Jersey No Drawing. Application August 16, 1956
Serial No. 604,310

1 Claim. (Cl. 208—26)

This invention relates to the decolorization of petroleum waxes and more particularly to an improved manner of treating both distillate and microcrystalline waxes by means of adsorptive clay to form wax products having improved color characteristics.

Petroleum waxes are generally treated with adsorptive clays for the purpose of decolorization so that the wax products will conform to various color specifications required in the industry. There are two methods of treatment in common use, namely, the percolation method and the so-called contact treatment. In the former the charge wax in liquid form is passed through a bed of adsorptive clay until the clay no longer has the desired decolorizing capacity, following which the clay either is discarded and replaced by fresh clay or is regenerated in a suitable manner for re-use. In the other method the clay and liquid wax are passed as a slurry through a contacting zone which provides a sufficient soaking period to effect the desired decolorization and then are separated from each other. Again, the clay may be either discarded or regenerated for re-use. These procedures are applicable in the treatment of both the paraffin or distillate waxes and the microcrystalline or residual waxes. Paraffin waxes generally have viscosities below 60 S.U.S. at 210° F., whereas the microcrystalline waxes generally have viscosities above this value.

The present invention is directed to and provides an improved manner of effecting decolorization of a paraffin wax and a microcrystalline wax is an integrated operation involving successive treatments of the two waxes with the same adsorptive clay. It has now been found that distinct improvements in the decolorizing capacity of the clay can be obtained by first using it to treat the distillate or paraffin wax and thereafter employing it directly for the treatment of the microcrystalline wax. In carrying out this procedure in accordance with the invention, either the percolation method or the contact method or both may be utilized.

In carrying out an operation in accordance with the invention, a fresh or regenerated adsorptive clay, such as bauxite, fullers earth, acid activated montmorillonite and the like, is first employed to decolorize a distillate wax. For example, a distillate wax heated to a temperature above its melting point and suitably within the range of 180–300° F. is percolated through a bed of the decolorizing clay. Passage of the liquid wax through the bed is continued until the clay loses its decolorizing ability to the extent that the wax effluent will no longer meet the desired color specifications. Commercial color specifications for light colored distillate waxes may vary somewhat but usually a minimum Saybolt color of about 25 is required. Thus, when the clay is no longer capable of yielding product meeting such requirement, the introduction of the distillate wax to the clay filter is stopped. The clay is then used directly, i.e. without being regenerated or treated to improve its decolorizing power, for decolorizing a microcrystalline or residium wax. Commercial specifications for light colored waxes of this type usually require N.P.A. colors of the order of 1–3. The used clay, even though being spent with respect to its ability to decolorize distillate waxes satisfactorily, has been found to have surprisingly good decolorizing capacity for the residual waxes. In fact, in some instances it has been found that the used clay has even better decolorizing ability for the microcrystalline waxes than fresh clay does. Furthermore, whereas in many instances treatment of microcrystalline wax with fresh clay yields a product which, while meeting color specifications, has a dull or dead appearance, similar treatment with used clay in accordance with the invention produces decolorized microcrystalline wax having a bright and more desirable appearance.

The invention thus provides an efficient manner of decolorizing both distillate and microcrystalline waxes which has distinct advantages over the conventional practice of treating each type of wax separately with fresh clay. A further advantage of the present process is that the overall loss of wax in the clay discarded from the decolorizing operation is substantially less than in conventional procedures.

A comparison of the following examples will illustrate advantages of the invention:

Example I

A dark microcrystalline wax having a melting point of about 153° F., a viscosity of about 80 S.U.S. at 210° F., an A.S.T.M. penetration of about 21 at 77° F. and an oil content of about 0.7% was percolated at 200° F. through a filter containing fresh activated bauxite. It was found that 670 gallons of effluent having an N.P.A. color of 1¾ could be obtained per ton of clay. The wax product, however, had a dull or dead appearance.

Example II

A batch of fresh activated bauxite was used in accordance with the invention for treating first a distillate wax and then the dark microcrystalline wax described in Example I. The distillatae wax had a melting point of about 156° F., a viscosity of about 44 S.U.S. at 210° F., an A.S.T.M. penetration of about 10, and an oil content of about 0.3%. The treatment was carried out by percolating this wax through the bauxite at a temperature of about 200° F. A yield of decolorized distillate wax product, having a Saybolt color of 30, of about 890 gallons per ton of clay was obtained. The used bauxite was then employed directly for treating the microcrystalline wax in the same manner as in the preceding example. It was found that 890 gallons of microcrystalline wax product having an N.P.A. color of 1¾ and also a bright appearance could be obtained per ton of clay.

These results in comparison with those of the first example show that practice of the invention permitted an increased yield of the desired microcrystalline wax product in addition to producing decolorized distillate wax. Also the microcrystalline wax product had an improved appearance.

Example III

The distillate and residual waxes described in the preceding examples were decolorized in accordance with the invention utilizing the contact method of treatment. The adsorbent used was a mixture of Attapulgus and Filtrol clays. First the distillate wax was contacted at 250° F. with the clay in amount of 5 lbs./bbl. for a time of 90 minutes. This yielded a product having +29 Saybolt color. The clay filtered from the treated distillate wax was used directly for decolorizing the dark residium wax. This was done by contacting the wax at 300° F. with the clay in amount of 80 lbs./bbl. for a time of 60 minutes. It was found that this treatment produced a microcrystalline wax product having an N.P.A. color of 2¾.

We claim:

Method of decolorizing petroleum waxes which comprises treating a distillate wax with an adsorptive clay to obtain a distillate wax product of improved color with a resultant loss of decolorizing ability of the clay toward said distillate wax, and then directly utilizing the used clay as the decolorizing adsorbent for treatinng a microcrystalline wax to obtain a microcrystalline wax product of improved color.

References Cited in the file of this patent

UNITED STATES PATENTS 2,726,997   Dudley et al _____ Dec. 13, 1955